United States Patent Office 2,773,795
Patented Dec. 11, 1956

2,773,795

RUBBER-FABRIC LAMINATES AND METHOD OF MAKING SAME

William B. Reynolds, Bartlesville, Okla., assignor to Phillips Petroleum Company, a corporation of Delaware No Drawing. Application January 5, 1953,
Serial No. 329,722

15 Claims. (Cl. 154—139)

This invention relates to rubber-fabric laminates. In a further aspect this invention relates to a particular bonding agent for producing these laminates and the process of preparing these bonding agents. In a further aspect this invention relates to the production of rubber-fabric laminates utilizing, as the bonding agent, an aqueous solution of a copolymer of a conjugated diene with a vinyl heterocyclic nitrogen base. In a further aspect this invention relates to the production of rubber-fabric laminates using a bonding agent comprising an aqueous solution of a copolymer, said copolymer being precipitated in the fabric following the impregnation of the fabric by this solution. In a further aspect this invention relates to the manufacture of rubber tires, wherein a strong rubber-fabric bond is provided.

Various materials have been suggested as bonding agents for the production of laminated articles. These include rubber latex and/or reclaimed rubber dispersions, which have been used as treating materials for bonding rubber to fabric in the making of tires, belts, and the like. Furthermore, resinous materials such as phenolformaldehyde resins, have been added to rubber latex and reclaimed rubber dispersions. Rubber latices or dispersions contain relatively large rubber particles and, when used as bonding agents, coat the surface of the material treated. When the treated cord or fabric is brought into contact with rubber and the vulcanization then effected, a bond is formed between the rubber and the bonding agent which, in turn, has already formed a bond with the tire cord or fabric. Bonds formed in this manner have not been entirely satisfactory, particularly in tire manufacture, since there is a tendency for the cord to separate from the rubber as the tire is subjected to constant flexing in service.

Each of the following objects is obtained by at least one of the aspects of this invention.

An object of this invention is to produce rubber-fabric laminates. A further object of this invention is to provide a bonding agent for use in these laminates. A further object of this invention is to provide a method for the production of these bonding agents. A further object of this invention is to provide a process of preparing rubber-fabric laminates wherein the fabric is treated with an aqueous bonding solution. A further object of this invention is to provide bonding agents comprising aqueous solutions of copolymers prepared from conjugated dienes and a vinyl heterocyclic nitrogen base. A further object of this invention is to provide automobile tires utilizing a bonding agent comprising an aqueous solution of these copolymers. A further object of this invention is to provide a process for making automobile tires comprising applying an aqueous solution of a butadiene/vinyl heterocyclic nitrogen base copolymer to the fabric, precipitating the polymer in the cord, applying a layer of rubber to the fabric, and vulcanizing the completed tire.

Other objects and advantages of this invention will be apparent to one skilled in the art upon reading the accompanying disclosure.

The term "rubber," when used in this disclosure, without a qualifying adjective, includes both natural and synthetic rubber.

I have discovered that superior rubber-fabric laminates may be produced by using an aqueous solution of the particular bonding agent of this invention. The use of an aqueous solution represents a definite advance in this art because, upon contact, the water present penetrates and swells the fiber which, in turn, facilitates entry of the bonding agent into the interior of the fiber. After bringing the rubber into contact with the treated cord and vulcanizing it, an exceptionally strong rubber-to-fabric bond is obtained.

Organic solvents have been used to dissolve bonding agents but such solvents do not penetrate and swell the fiber as does water. An additional advantage of an aqueous solution, instead of a latex which is sometimes employed, is that it does not contain materials such as emulsifying agents, salts, and other ingredients employed in the polymerization recipe, and consequently are present in the latex. These materials, and in particular the emulsifying agents, have certain deleterious effects. Finally, because of the swelling effect of the aqueous solution, there is a better contact of the treating material with the fabric using the process of my invention.

According to my invention a copolymer of a conjugated diene with a vinyl-substituted heterocyclic nitrogen base is employed, in the form of an aqueous acid solution, as the bonding agent in producing the rubber-fabric laminates. The process comprises treating the fabric with this aqueous acid solution and then applying the rubber to the fabric by an operation such as calendering, and finally, heating to vulcanize the rubber and form a strong rubber-to-fabric bond. The fabric may be dried following the application of the bonding agent and before the rubber is applied thereto, but this is not absolutely necessary when working in a system wherein the water present in the fabric will not interfere.

In a modification of this process, the fabric is passed through an alkaline solution after treatment with the aqueous acid polymer solution. This treatment causes the polymer to precipitate in the fabric. Following the alkaline treatment, the rubber is applied as before.

The polymeric materials employed as bonding agents are copolymers of conjugated dienes with a vinyl-substituted heterocyclic nitrogen base, preferably of the pyridine or quinoline series. The conjugated dienes employed are preferably those which contain four to six, inclusive, carbon atoms per molecule and include 1,3-butadiene, isoprene, piperylene, methylpentadiene, 2,3-dimethyl-1,3-butadiene, chloroprene, and others. However, conjugated dienes having more than six, such as eight, carbon atoms per molecule are also considered applicable. Furthermore, various alkoxy, such as methoxy and ethoxy, and cyano derivatives of these conjugated dienes can also be used.

The heterocyclic nitrogen bases which are applicable include those of the pyridine and quinoline series which are copolymerizable with a conjugated diene and contain at least one

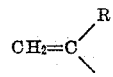

substituent wherein R is either hydrogen or a methyl group, i. e., the substituent is either a vinyl or an alpha-methyl-vinyl (isopropenyl) group. The vinyl-substituted heterocyclic nitrogen bases of the pyridine and quinoline series which are preferred are those having only one

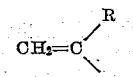

substituent and of these compounds those belonging to the pyridine series are most frequently used. Various alkyl-substituted derivatives can also be used but it is generally preferred that the total number of carbon atoms in the nuclear substituted alkyl groups should not be greater than 12 and most frequently these alkyl substituents are methyl and/or ethyl. It is to be understood that mixtures of various conjugated dienes and mixtures of various copolymerizable heterocyclic nitrogen bases can be employed in the practice of the invention.

When preparing the conjugated diene-vinyl heterocyclic nitrogen base copolymers, at least 10 percent by weight of the monomeric material is the conjugated diene. The minimum amount of the vinyl heterocyclic nitrogen base is controlled by the amount required to produce a copolymer which is soluble in aqueous acid solution. This component generally comprises at least 25 percent by weight of the monomeric material although in some instances a smaller quantity might be used. Generally the amount of conjugated diene component is in the range between 10 and 75 parts by weight, and the heterocyclic nitrogen base component is in the range between 90 and 25 parts by weight, per 100 parts of monomeric material. The ranges most frequently preferred are 50 to 70 parts by weight of the conjugated diene component and 50 to 30 parts by weight of the vinyl heterocyclic nitrogen base component.

The conjugated diene-vinyl heterocyclic nitrogen base copolymers herein described can be produced by methods known to the art and can range from liquids to hard rubbers.

For the preparation of the rubber-fabric laminates in accordance with the process of this invention, the polymeric materials to be used as bonding agents are first dissolved in aqueous solutions of acid. The procedure employed for dissolving the polymer is governed by the concentration of the solution that it is desired to prepare, the particular acid used, and the polymer being dissolved. Solutions containing a concentration of polymer around two percent by weight and below are, in general, fairly easy to prepare and are of low viscosity while those of higher concentration, such as those containing five percent polymer by weight and higher, are frequently quite viscous.

In one method of preparing an aqueous solution of the polymer, an acid solution of the desired concentration is prepared first, the polymer is added, and the mixture is agitated until solution is effected. Sometimes a more concentrated solution of acid is employed than is desired in the final solution. After the polymer is dissolved, the solution is diluted to the desired concentration. In instances where a liquid acid, such as acetic, is used, a polymer can be treated with the glacial acid and the mixture then diluted prior to use. Regardless of the acid concentration employed, the polymer dissolves with the formation of a pyridinium salt.

It is sometimes desirable to include an organic solvent with the water and acid, particularly a water-miscible organic solvent such as methyl, ethyl, propyl, isopropyl, or tert-butyl alcohol, ethylene glycol, glycerol, erythritol, or dioxane. Such auxiliary solvents are particularly useful when preparing polymer solutions of around five per cent by weight and higher. Through the use of these organic solvents, polymer solutions of fairly high concentration but low viscosity are readily obtained.

One convenient method of preparing polymer solutions using an organic solvent in addition to the water and acid comprises treatment of the polymer with a portion of the acid and organic solvent, then gradually diluting the remainder of the acid-organic solvent mixture with water and adding it at intervals, following each dilution, until all the solvent is introduced.

Acids which are applicable include both saturated and unsaturated aliphatic monobasic and dibasic organic acids as well as mineral acids. It is generally preferred to use organic acids and those which are water soluble are most frequently employed. However, when an organic solvent is used along with the water and acid, polymer solutions can be obtained using higher molecular weight acids. Organic acids which are within the scope of the invention are those containing from one to 18, inclusive, carbon atoms per molecule and include formic, acetic, propionic, butyric, oxalic, malonic, maleic, succinic, glutaric, glycolic, chloroacetic, dichloroacetic, trichloroacetic, lauric, oleic, and stearic acids Hydrochloric, sulfuric, nitric, and phosphoric acids are also applicable.

The amount of acid employed when preparing the polymer solutions need be only that which is necessary to effect solution. As the ratio of the vinyl heterocyclic nitrogen base component to the conjugated diene component in the copolymer is increased, less acid is required to effect solution, other factors being kept constant. Generally the amount of acid is in the range between 0.25 and 25 stoichiometric equivalents per basic group in the copolymer. Polymer solutions generally range in concentration between 0.5 and 10 percent by weight. However, in instances where solutions of higher concentration can be prepared, they are applicable.

The acidity of the polymer solution is regulated so that the fabric or tire cord being treated will not be harmed. The pH is preferably in the range between 2 and 6.

Tire cord or fabric to be treated in accordance with the present invention is passed through an aqueous acid solution of the polymer, squeezed to remove excess solution, and dried. The temperature of this treating operation can be varied over a wide range, any temperature just above the freezing point of the mixture up to around 180° F. or even higher being considered applicable. It is frequently desirable to operate at a fairly high temperature so long as the polymer does not precipitate from the solution.

Following treatment of the tire cord with the aqueous acid solution of the polymer and squeezing to remove excess solution, the cord can then be subjected to further treatment which includes passing it into an alkaline bath to cause precipitation of the polymer from the pyridinium salt, rinsed to remove excess alkaline solution, and dried. It is sometimes preferred to operate in this manner although this step is not necessary in order to obtain an exceptionally strong rubber-to-fabric bond. Alkaline treating materials include alkali metal hydroxides, carbonates, and bicarbonates, preferably the sodium and potassium compounds. Subsequent to the alkaline treatment, the fabric is rinsed to remove any excess of basic material, and dried.

After a fabric is treated with an aqueous acid solution of polymeric material, it is not essential that it be dried before immersing it in the alkaline bath. However, it may be desirable to remove some of the water in order that substantially all the polymeric material, which is in the form of a pyridinium salt, will adhere to the fabric during treatment with the basic solution. The alkaline treating solution, which converts the pyridinium salt to the free polymeric base, should be of such concentration that it will not harm the fabric. Preferably a concentration not greater than one percent by weight is employed, or, expressed in other terms, a 0.01 N to 0.25 N solution is employed.

A solution of a resin-forming material, such as a phenolic compound and an aldehyde, e. g., resorcinol and formaldehyde, is sometimes added to the alkaline treating bath although this material is not necessary to the successful operation of the invention. Generally this alkaline mixture is allowed to stand several hours to permit an initial condensation to take place between the phenolic compound and the aldehyde. Other additive agents can also be employed in the alkaline bath if desired.

When an alkaline treating solution is employed in conjunction with the aqueous acid solution of the polymer, it is within the scope of the invention to dip the cord or fabric into the alkaline bath first and then into the polymer solution.

Following the cord treating or dipping operation, a rubber composition such as a tire carcass composition is calendered onto the fabric and then vulcanized. An exceptionally strong bond between the rubber and fabric is formed.

The process of this invention is particularly valuable for bonding cotton and rayon to natural and synthetic rubbers to be used in the manufacture of tires, belts and the like. The process is also operable for bonding nylon, Orlon, and Dacron to rubber.

*Example I*

A 60/40 butadiene/2-methyl-5-vinylpyridine rubbery copolymer was prepared by emulsion polymerization at 122° F. in accordance with the following recipe:

| | Parts by weight |
|---|---|
| Butadiene | 60 |
| 2-methyl-5-vinylpyridine | 40 |
| Water | 180 |
| Fatty acid soap | 5 |
| $K_2S_2O_8$ | 0.3 |
| Mercaptan blend[1] | 0.35 |

[1] A blend of $C_{12}$, $C_{14}$ and $C_{16}$ tertiary aliphatic mercaptans in a ratio of 3 : 1 : 1 parts by weight.

Sixty grams of the above described copolymer was treated with 50 grams of glacial acetic acid and 100 grams of isopropyl alcohol. The mixture was shaken and heated to facilitate solution and then diluted with a mixture containing 50 grams glacial acetic acid, 100 grams isopropyl alcohol, and sufficient water to give 1000 cc. of polymer solution. The dilution was effected in a manner which comprised adding a portion of the water to the acetic acid-isopropyl alcohol mixture followed by introducing a portion of this solution into the previously prepared polymer mixture, then adding another portion of water to the remainder of the acetic acid-isopropyl alcohol mixture, and repeating the operation until all the ingredients were added to the original polymer mixture. The final solution contained 6 percent by weight of polymer, 10 percent by weight of acetic acid and 20 percent by weight of isopropyl alcohol.

Rayon tire cord was dipped into the aqueous acid solution of the butadiene/2-methyl-5-vinylpyridine copolymer at a temperature of approximately 75–90° F., squeezed to remove surplus solution, and dried in a forced air oven at a temperature of approximately 150–212° F. The treated cord was then incorporated into a carcass rubber composition and vulcanized using an "H" adhesion mold.[1] The resulting composite structure, when tested to determine the adhesion between the rubber and the cord, gave an average value of 18.25 pounds. A standard fabric dip for rayon, comprising GR–S latex containing a resorcinol-formaldehyde condensation product, was employed as a control. When rayon cord was treated with this material and incorporated into a carcass rubber composition as above, results of "H" adhesion tests gave an average value of 17.59 pounds.

*Example II*

A 50/50 butadiene/2-methyl-5-vinylpyridine rubbery copolymer, prepared by emulsion polymerization at 122° F., is dissolved by treatment with oxalic acid and isopropyl alcohol followed by dilution with an oxalic acid-isopropyl alcohol-water mixture according to the procedure given in Example I. When rayon tire cord is dipped into this solution, dried, and incorporated into a carcass rubber composition and vulcanized, an exceptionally strong rubber-to-fabric bond is obtained.

*Example III*

A 50/50 butadiene/2-methyl-5-vinylpyridine rubbery copolymer was dissolved in a 15 percent aqueous solution of acetic acid in the proportion of 1.5 grams of polymer per 100 cc. of solution. When this solution is employed as a cord dip composition and tested as in Example I, excellent results are obtained.

*Example IV*

A 60/40 butadiene/2-methyl-5-vinylpyridine copolymer was prepared by emulsion polymerization at 122° F. and then dissolved in a mixture of isopropyl alcohol and acetic acid. The acetic acid used was composed of 90 percent glacial acetic acid and 10 percent acetic anhydride. The copolymer was added gradually to a mixture of one-half the desired amount of alcohol and acetic acid. The mixture was then heated to 150° F. and kept at this temperature for 16 hours except for periods of approximately 15 minutes every two hours during which the mixture was stirred with an air stirrer. At the end of the 16-hour period, a small portion of the remaining alcohol-acid mixture was added to the gelatinous polymer solution and the mixture stirred until well blended. A portion of the water to be employed was then mixed with the remaining acid and alcohol and a small portion of the resulting mixture blended into the copolymer solution. This procedure was repeated adding a small portion of water, acid, and alcohol until the desired composition was achieved. The solution was maintained at 150° F. and stirred constantly during the addition of the water, acid, and alcohol. The acetic acid and isopropanol were used in proportions of approximately 1:2 parts by weight. The final solution contained 5.4 weight percent of the copolymer.

Rayon tire cord was dipped into the above described copolymer solution in preparation for H-adhesion tests. For a control another cord-dip composition was prepared by adding resorcinol-formaldehyde resin to a 71/29 butadiene/styrene copolymer latex, 24 grams of the resin being added per 100 grams of rubber. The resorcinol-formaldehyde resin was prepared by adding 30 grams of formaldehyde to 110 grams of resorcinol and activating the reaction with 0.33 percent of NaOH based on the resorcinol-formaldehyde. The mixture was warmed and, after the appearance of a reddish color, was added to the butadiene/styrene copolymer latex.

The cords were weighed, dipped for 30 seconds in the previously prepared composition, dried for one hour at 212° F., and reweighed to determine the pick-up. These dried cords were then inserted in the H-adhesion mold, and cured into the rubber compound given in the following carcass recipe:

| | Parts by weight |
|---|---|
| Natural rubber | 40 |
| Butadiene/styrene rubber (41° F.) | 40 |
| U. S. reclaim | 40 |
| Zinc oxide | 3 |
| Agerite resin[1] | 1 |
| Paraflux[2] | 5 |
| Rosin oil | 0.5 |
| Stearic acid | 1 |
| Captax[3] | 0.4 |
| Altax[4] | 0.25 |
| Sulfur | 2.5 |
| Carbon black (Philblack A) | 25 |

[1] Aldol-alpha-naphthylamine.
[2] Saturated polymerized hydrocarbon.
[3] 2-mercaptobenzothiazole.
[4] Benzothiazyl disulfide.

---
[1] Mold and test described in India Rubber World 114, 213 (May 1946).

Prior to being inserted into the H-adhesion mold, the carcass stock was calendered onto muslin cloth to give a sheet 0.060–0.065 inch thick from which strips were cut ⅜ by 10 inches to fit the mold. These strips formed a sandwich with cloth on the outside and rubber-surrounded cords in the middle. Curing was effected at 307° F. for 30 minutes. This cloth is used to prevent tearing of the rubber at the corners of the test specimens. After curing the material was cut to give H-shaped specimens. Tests to determine the adhesion between the rubber and the cord were made by approximately 75° F. and the following results were obtained:

| Cord | Butadiene/2-methyl-5-vinylpyridine Copolymer solution | | | Butadiene/styrene latex + resorcinol/formaldehyde resin | | |
|---|---|---|---|---|---|---|
| | Pounds Pull | | Pick up, mg./in. | Pounds Pull | | Pick up, mg./in. |
| 1 | 12.5 | 13.5 | 13 | 0.9 | 10 | 10 | 9 | 0.85 |
| 1 | 12.5 | 13.5 | 14 | | 9 | 9 | 11 | |
| 2 | 12 | 14 | 12.5 | 1.0 | 10 | 9 | 10 | 1.1 |
| 2 | 12.5 | 12.5 | 12 | | 10.5 | 12 | 10 | |
| 3 | 11 | 12.5 | 12 | 0.9 | 10 | 10.5 | 10 | 1.1 |
| 3 | 11.5 | 14 | 11.5 | | 10 | 11 | 10 | |
| 4 | 12 | 14 | 11 | 1.0 | 10 | 10 | 9.5 | 1.0 |
| 4 | 11 | 11.5 | 13.5 | | 10 | 11 | 10 | |
| 5 | 13 | 14.5 | 10.5 | 0.9 | 10 | 12 | 9.5 | 0.8 |
| 5 | 11.5 | 12 | 12 | | 10 | 9.5 | 11 | |
| Average | 12.5 | | | | 9.9 | | | |

*Example V*

The following cord-dip compositions were prepared from a 60/40 butadiene/2-methyl-5-vinylpyridine copolymer latex:

| Sample No. | Type of Dip | Percent Solids Content | Other Ingredients |
|---|---|---|---|
| 1 | solution | 6 | 10% acetic acid, 20% isopropanol. |
| 2 | do | 2 | 5% acetic acid, 10% isopropanol. |
| 3 | latex | 6 | fatty acid soap, antioxidant, etc. |
| 4 | do | 2 | Do. |

Rayon tire cords were dipped into each composition and cured into the carcass stock as in Example IV. Two control runs were made using the butadiene/styrene latex containing resorcinol/formaldehyde resin described in Example IV. Curing was effected at 307° F. for 30 minutes. Tests made at approximately 75° F. to determine the adhesion between the rubber and the cord gave the following results:

| Sample No. | Pounds Pull [1] | Pick-up, mg./in. |
|---|---|---|
| 1 | 11.9 | 1.8 |
| 2 | 10.7 | 0.6 |
| 3 | 10.7 | 0.2 |
| 4 | 8.8 | |
| Control | 8.1 | 0.6 |
| Do | 8.1 | 0.6 |

[1] Average of six tests.

As many possible embodiments may be made of this invention without departing from the scope thereof, it is to be understood that all matter herein set forth is to be interpreted as illustrative and not in a limiting sense.

I claim:

1. A non-metallic fabric-rubber laminate comprising at least one fabric element and a layer of rubber attached thereto, the elements of said laminate having been bonded by means of a bonding agent comprising an aqueous acid solution containing at least 0.5 weight percent of a copolymer prepared by polymerizing a mixture consisting essentially of at least one conjugated diene and a polymerizable compound selected from the group consisting of pyridines and quinolines containing the group

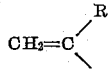

where R is selected from the group consisting of H and $CH_3$, said conjugated diene comprising at least 10 parts by weight per 100 parts of the monomers.

2. The laminate of claim 1 in which said conjugated diene is butadiene and said nitrogen base is 2-methyl-5-vinylpyridine.

3. A process of preparing a non-metallic fabric-rubber laminate comprising treating the fabric with an aqueous acid solution containing at least 0.5 weight percent of a copolymer prepared by polymerizing a mixture consisting essentially of at least one conjugated diene and a polymerizable compound selected from the group consisting of pyridines and quinolines containing the group

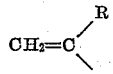

where R is selected from the group consisting of H and $CH_3$, said conjugated diene component comprising at least 10 parts by weight per 100 parts of monomers, applying a layer of rubber thereto, and heating the resulting laminate to vulcanize said rubber and to form a strong rubber-to-fabric bond.

4. The process of claim 3 in which an organic solvent is present in addition to said aqueous acid solution.

5. The process of claim 3 in which said conjugated diene is butadiene and said nitrogen base is 2-methyl-5-vinylpyridine.

6. A process of preparing a rubber-fabric laminate comprising treating the fabric with an aqueous acid solution containing at least 0.5 weight percent of a copolymer prepared by polymerizing a mixture consisting essentially of at least one conjugated diene and a polymerizable compound selected from the group consisting of pyridines and quinolines containing the group

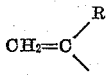

where R is selected from the group consisting of H and $CH_3$, said conjugated diene component comprising at least 10 parts by weight per 100 parts of monomers, passing the thus treated fabric through an alkaline bath to precipitate the polymer in the fabric, applying a layer of rubber thereto, and heating the resulting laminate to vulcanize said rubber and to form a strong rubber-to-fabric bond.

7. The process of claim 6 in which said alkaline bath contains a material selected from the group consisting of alkali metal hydroxides, carbonates and bicarbonates.

8. The process of claim 7 in which the normality of the alkaline bath is 0.01 to 0.25.

9. The process of claim 6 in which said conjugated diene is butadiene and said nitrogen base is 2-methyl-5-vinylpyridine.

10. A process of preparing a non-metallic fabric-rubber laminate comprising treating the fabric with an aqueous acid solution containing 0.5 to 10 percent by weight of a copolymer prepared by polymerizing a mixture of 10 to 75 parts by weight per 100 parts of monomers of a conjugated diene and 90 to 25 parts by weight of a polymerizable compound selected from the group consisting of pyridines and quinolines containing the group

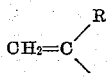

where R is selected from the group consisting of H and $CH_3$, applying a layer of rubber thereto, and heating the resulting laminate to vulcanize said rubber and to form a strong rubber-to-fabric bond.

11. A process of preparing a rubber-fabric laminate comprising treating the fabric with an aqueous acid solution containing 0.5 to 10 percent by weight of a copolymer prepared by polymerizing a mixture of 100 to 75 parts by weight per 100 parts of monomers of a conjugated diene and 90 to 25 parts by weight of a polymerizable compound selected from the group consisting of pyridines and quinolines containing the group

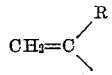

where R is selected from the group consisting of H and CH₃, passing the thus treated fabric through an alkaline bath to precipitate a polymer in the fabric, applying a layer of rubber thereto, and heating the resulting laminate to vulcanize said rubber and to form a strong rubber-to-fabric bond.

12. A rubber-fabric laminate comprising at least one fabric element and a layer of rubber attached thereto, the elements of said laminate having been bonded by treating said fabric with an aqueous acid solution containing at least 0.5 weight percent of a copolymer prepared by polymerizing a mixture consisting essentially of at least one conjugated diene and a copolymerizable compound selected from the group consisting of pyridines and quinolines containing the group

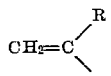

where R is selected from the group consisting of H and CH₃, said conjugated diene component comprising at least 10 parts by weight per 100 parts of monomers and subsequently with an alkaline solution containing a compound selected from the group consisting of alkali metal hydroxides, carbonates, and bicarbonates.

13. The laminate of claim 12 in which said conjugated diene is butadiene and said nitrogen base is 2-methyl-5-vinylpyridine.

14. A rubber-fabric laminate comprising at least one fabric element and a layer of rubber attached thereto, the elements of said laminate having been bonded by treating said fabric with an aqueous acid solution containing 0.5 to 10 percent by weight of a copolymer prepared by polymerizing a mixture of 10 to 75 parts by weight per 100 parts of monomers of a conjugated diene and 90 to 25 parts by weight of polymerizable compound selected from the group consisting of pyridines and quinolines containing the group

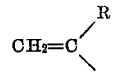

where R is selected from the group consisting of H and CH₃, and subsequently with an alkaline solution containing a compound selected from the group consisting of alkali metal hydroxides, carbonates and bicarbonates.

15. A non-metallic fabric-rubber laminate comprising at least one fabric element and a layer of rubber attached thereto, the elements of said laminate having been bonded by means of a bonding agent comprising an aqueous acid solution containing 0.5 to 10 percent by weight of a copolymer prepared by polymerizing a mixture of 10 to 75 parts by weight per 100 parts of monomers of a conjugated diene and 90 to 25 parts by weight of at least one polymerizable compound selected from the group consisting of pyridines and quinolines containing the group

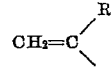

where R is selected from the group consisting of H and CH₃.

References Cited in the file of this patent

UNITED STATES PATENTS

| | | |
|---|---|---|
| 2,402,020 | Cislak et al. | June 11, 1946 |
| 2,561,215 | Mighton | July 17, 1951 |
| 2,619,445 | Kalafus | Nov. 25, 1952 |

OTHER REFERENCES

Chemical and Engineering News, November 3, 1947, reverse side of front cover.